Figure 1:
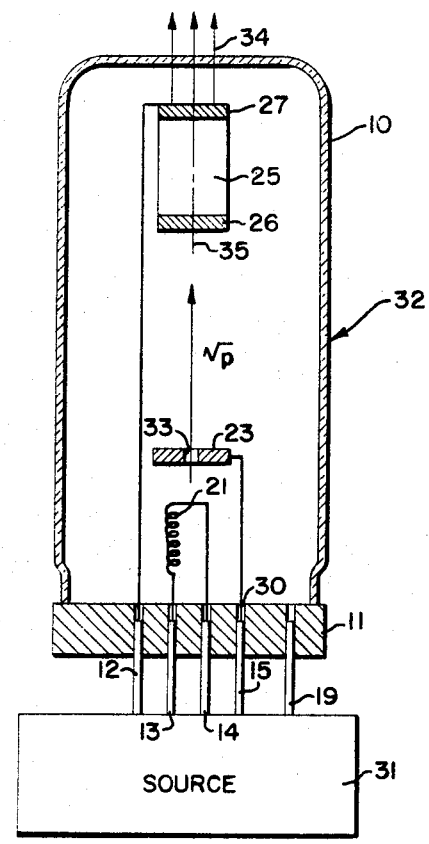

July 16, 1968  M. STIMLER  3,393,373

ELECTRON STIMULATED OPTICAL MASER

Filed July 11, 1963

INVENTOR.
MORTON STIMLER

BY

ATTORNEY.

3,393,373
ELECTRON STIMULATED OPTICAL MASER
Morton Stimler, 8308 14th Ave.,
Hyattsville, Md. 20783
Filed July 11, 1963, Ser. No. 294,456
2 Claims. (Cl. 331—94.5)

The invention described herein may be manufactured and used by or for the Government of the United States of America for governmental purposes without the payment of any royalties thereon or therefor.

The present invention relates to light amplification by stimulated emission of radiation and more particularly to an optical maser wherein the emission is stimulated by electron bombardment of a semiconductor material.

In the field of optical masers, it has been the general practice to employ optical pumping or stimulating devices such as xenon flash lamps to provide the pumping energy to an appropriate maser material. Although such devices have served the purpose, they have not proved entirely satisfactory under all conditions of service for the reason that considerable difficulty has been experienced in achieving highly efficient devices. Maser devices utilizing flash lamps to optically pump the active material thereof require high voltage energizing sources which commonly take the form of a capacitor bank and attendant capacitor charging source. Losses are encountered in the AC-DC conversion of electrical energy required to charge the capacitor bank and in converting the electrical energy supplied by the capacitor bank into light energy or photons due to conventional electrical losses and flash lamp inefficiency. Furthermore, these optical maser devices are provided with reflecting surfaces surrounding the flash lamps to aid in directing a substantial portion of the energy emanating from the lamps toward the active material. Only a portion of the energy emitted by the sources is reflected by such surfaces toward the active material, and these additional losses are accumulative with the other losses heretofore described, thereby rendering the entire optical maser system less efficient than a system wherein these losses are eliminated. Furthermore, the AC-DC inversion components and the large capacitor bank required by the flash lamps in such maser devices render them quite bulky and preclude compact design of high energy optical maser systems.

It is therefore an object of this invention is to provide an electron stimulated optical maser which embraces all the advantages of similarly employed optical masers and possesses none of the aforedescribed disadvantages.

Another object of the present invention is the provision of an active element for obtaining efficient optical maser action.

Yet another object is to provide a semiconductor active element in which the stimulated emission of radiation occurs when an electron beam is caused to impinge thereon.

A further object of the invention is the provision of an optical maser which is activated by the kinetic energy of moving electrons.

Still another object is to provide a highly efficient, compact optical maser which is capable of coherent amplification of electromagnetic radiation.

A still further object of the present invention is the provision of a method of efficiently generating optical maser energy by bombarding a semiconductive material with electrons.

According to the present invention, the foregoing and other objects are attained by bombardment of a semiconductor material with electrons falling through a difference in potential. The semiconductor material is pumped by the electron beam, and stimulated emission occurs by the change of energy levels as in conventional optical maser action.

Figure 2:
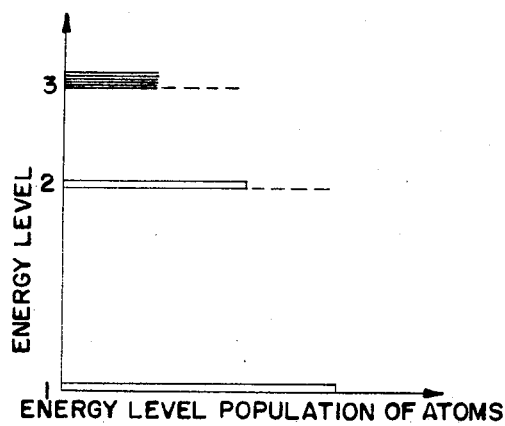

Other objects and many attendant advantages of this invention will be readily appreciated as the same becomes better understood by reference to the following detailed description when considered in connection with the accompanying drawings wherein:

FIG. 1 shows a plan view, partly in section, of a preferred embodiment of the invention; and FIG. 2 is a schematic representation of the energy levels of atoms in the active element material of the invention versus the population at said energy levels.

Referring now to the drawings, wherein like reference characters designate like or corresponding parts throughout the several views, there is shown in FIG. 1, which illustrates the preferred embodiment, an evacuated chamber 10 such as, for example, an X-ray tube or cathode ray tube, mounted on a base 11 constructed of an insulating material such as that ordinarily used in the construction of vacuum tubes. The insulating base 11 has base pins 12, 13, 14 and 15 extending into apertures 30 therein and securely attached to said base. The base pins 12–15 serve as electrical connectors for electrically connecting the electron stimulated optical maser 32 to a variable source of electrical energy 31.

Pins 13 and 14 are electrically connected to a filament heater 21 which emits electrons when thermally activated by an electrical current supplied to the pins 13 and 14 by the variable source of electrical energy 31. Pin 15 is electrically connected to an accelerating anode 23 which takes the form of an annular ring for accelerating and directing the electrons emanating from filament heater 21 through the aperture 33 of the accelerating anode 23. The combination of the filament heater 21 and accelerating anode 23 is used to emit an electron beam and is commonly referred to as an electron gun. Electron guns of this type are commonly employed in cathode ray tubes wherein an electron beam is caused to impinge upon a coated surface which responds to this electron beam by emitting light of an intensity which corresponds to the magnitude of the electron beam.

It should be understood that in practicing the invention, the electron gun may be of the form set forth hereinabove or it may take any number of various forms such as; for example, a magnetic particle accelerator. The essential feature is that an electron beam having substantial kinetic energy be developed by falling through an electric potential of the proper magnitude.

A semiconductive material 25 of the types used in semiconductor devices such as; for example, germanium or silicon is positioned in the chamber 10 in mutually spaced relationship with the electron gun. It should be understood that the semiconductor material 25 may be any semiconductor material or combinations thereof characterized by having at least two energy band levels. Furthermore, ruby material can be utilized wherein the ruby takes the form of a cylindrical tubular rod whereby penetration due to an impinging electron beam is enhanced. One end of the semiconductor material 25 is coated with a reflective conducting surface 26. This reflective surface coating material may be a metal such as silver, aluminum or gold. The reflective coating 26 is reflective to the wavelength of the energy emitted by the semiconductor or ruby 25. This coating is sufficiently thin to enable impinging electrons to penetrate it and pass through to the semiconductor material and be collected on surface 27. The other end of the semiconductor material 25 is coated with a partially reflective surface 27 which is electrically conductive. The electrical conductive partially reflective surface 27 functions in the same manner as the plate or anode of a vacuum tube and is electrically connected to pin 12 whereby an electrical potential may be applied thereto from the variable source of electrical energy 31. An additional pin 19 may be provided to serve as a ground connection to the filament sleeves around the heaters. These filament sleeves have been omitted from FIG. 1 for the purpose of clarity.

FIG. 2 is a schematic representation of the energy levels of the atoms in an optical maser active material which has, by way of example, four levels. The desired condition for operation of an optical maser occurs when a minimum population inversion exists. This population inversion will continue until a particular degree of inversion is obtained. At this point, amplification by stimulated emission occurs wherein the normal population distribution among energy levels tends to be restored. It is this process which gives rise to the emission of radiation in accordance with Planck's law, i.e.

$$\nu = \frac{E_H - E_L}{h}$$

where $h$ is Planck's constant, $\nu$ is the frequency of the radiated energy, $E_H$ is the higher energy level and $E_L$ is the lower energy level.

The relaxation process radiates energy in all directions. That spontaneous emission of energy which is radiated at all angles to the longitudinal axis 35 of the active material takes the form of incoherent emission. However, energy emitted parallel to the axis of the active element material, stimulates the pumped atoms of the active element material so as to further emit quanta of energy from these atoms in the resonant cavity formed between the two reflecting end surfaces. This results in an avalanche of the relaxation process providing stimulated emission of coherent radiation.

Referring to FIG. 2 population inversion between 2 and 3 can be obtained by pumping the atoms from energy state 1 to energy state 2 via energy band 3. This corresponds to the conduction and valence energy bands of a semiconductor material and is set forth as shown in FIG. 2 merely for purposes of illustration. The energy required for this pumping is:

$$E_p = E_3 - E_1 = h\nu_p$$

where $E_3$ represents the energy of a given energy level and $\nu_p$ is the frequency associated with the photon or quantum of energy $h\nu$. When the atoms have been pumped to energy level 3 they remain at this level for the very short lifetime period of this state and decay to energy level 2 where they remain for a longer lifetime period. This decay from energy level 3 to energy level 2 results in what is referred to as a nonradiative decay. The result of this nonradiative decay is the dissipation of energy in the form of heat. Atoms are continually pumped from energy level 1 to energy level 3 and undergo this nonradiative decay to energy level 2 where they remain for a sufficient period of time, so that statistically the population of energy level 2 with respect to that of energy level 1 increases until the condition of population inversion obtains. At this point amplification by stimulated emission takes place wherein the atoms at energy level 2 are stimulated to emit their energy thereby decaying to energy level 1.

In prior art optical masers, wherein flash lamps such as xenon lamps are utilized, photons of light energy $h\nu$ are generated by the lamps and supplied to the active material in order to excite the atoms from the ground state, $E_1$, to the higher energy level, $E_3$. The optical maser device 32 shown in FIG. 1 effects this same pumping to the higher energy level by bombarding the active material with electrons of the proper velocity. This velocity must be such that it satisfies the following equation:

$$\tfrac{1}{2}mV_p^2 = E_3 - E_1 = h\nu p$$

wherein $m$ is the mass of the electron and $V_p$ is the velocity of the electrons.

The electrons emitted from the filament heater 21 are accelerated by anode 23 and directed via aperture 32 toward the semiconductor material 25. Since the conducting surface 27 which serves the dual purpose of an energy reflective surface and a conducting surface, also acts as the ordinary plate or anode of a vacuum tube, the electrons will penetrate and flow through the semiconductor 25 and be collected by this surface 27. If an additional amount of energy $E^1$ is required, for example, to penetrate the reflective surface 26, the velocity of the electrons will have to be increased such that the following equation is satisfied:

$$\tfrac{1}{2}mV_p^2 = E_4 - E_1 + E^1 = h\nu p$$

Thus it may be seen that the required for pumping may be imparted by an electron beam as well as by photons of light energy.

This electron stimulated optical maser 32 can be pumped by the electron beam energy to operate in a conventional manner. For example, modulation of the radiated energy 34 in order to supply information to the signal can be carried out in the same manner as modulation of the light photon optical masers. Furthermore, it should be understood that the invention is not dependent upon a particular electron gun described herein, but any electron beam generating means which can be controlled and which can supply electrons in sufficient quantity and at the required velocities.

Thus it may be seen that the principle of an electron beam being made to pass through a semiconductive material can be employed to provide the pumping energy to said semiconductive material whereby maser operation within the semiconductor material results in stimulated emission of light energy.

Various modifications are contemplated and may obviously be resorted to by those skilled in the art without departing from the spirit and scope of the invention, as hereinabove defined and by the appended claims, as only a preferred embodiment thereof has been disclosed.

What is claimed is:

1. An electron stimulated optical maser for amplifying energy when supplied with pumping energy from an external source of electrical energy comprising:
   (a) an evacuated chamber
   (b) semiconductor material characterized by having at least two energy levels disposed in said chamber, said semiconductor material having first and second faces, said faces being substantially parallel,
   (c) a first coating of a reflective material on the first of said faces for totally reflecting energy radiated by said semiconductor material,
   (d) a second coating of a partially reflective material on the second of said faces for partially reflecting and partially transmitting said radiated energy, said second reflective coating being electrically conductive and electrically connected to the external source whereby said second reflective coating acts as an anode, and
   (e) an electron gun disposed in said chamber and connected to the external source for directing an electron beam against said first coat of reflective material, said beam having sufficient energy and being of sufficient magnitude to penetrate said first coat of reflective material, thereby pumping said semiconductor material to produce a population inversion between two separated energy levels.

2. The electron stimulated optical maser of claim 1 wherein:
   (a) the semiconductor material takes the form of a thin cylindrical rod.

References Cited

UNITED STATES PATENTS 3,202,934   8/1965   Coffee _____ 331—94.5

FOREIGN PATENTS 1,335,136   7/1963   France.

OTHER REFERENCES

Basov: "Negative Absorption Coefficient at Indirect Transistions in Semiconductors," Advances in Quantum Electroncis, ed. by Singer, N.Y., Columbia University Press, 1961, pp. 496–506.

JEWELL H. PEDERSEN, *Primary Examiner.*

E. S. BAUER, W. L. SIKES, *Assistant Examiners.*